(12) United States Patent
Dreher, Jr.

(10) Patent No.: US 7,722,062 B2
(45) Date of Patent: May 25, 2010

(54) TORQUE REACTION CONTROL LINK

(76) Inventor: Gordon A. Dreher, Jr., 189 Euclid Ave., Kenmore, NY (US) 14217

( * ) Notice: Subject to any disclaimer, the term of this patent is extended or adjusted under 35 U.S.C. 154(b) by 139 days.

(21) Appl. No.: 11/999,579

(22) Filed: Dec. 5, 2007

(65) Prior Publication Data
US 2008/0088106 A1 Apr. 17, 2008

Related U.S. Application Data

(63) Continuation-in-part of application No. 10/909,189, filed on Jul. 30, 2004, now Pat. No. 7,334,806.

(60) Provisional application No. 60/491,503, filed on Jul. 31, 2003.

(51) Int. Cl.
*B60G 9/00* (2006.01)
*B60G 7/00* (2006.01)
*B60G 9/02* (2006.01)

(52) U.S. Cl. .................. 280/124.1; 280/124.104; 280/124.128; 280/124.153; 280/124.11; 280/124.116

(58) Field of Classification Search .......... 280/124.104, 280/124.1, 124.128, 124.153, 124.156, 124.11, 280/124.116; 180/352
See application file for complete search history.

(56) References Cited
U.S. PATENT DOCUMENTS

| 2,300,844 | A |   | 11/1942 | Olley |   |
|---|---|---|---|---|---|
| 2,669,315 | A | * | 2/1954 | Butterfield | 180/345 |
| 3,174,771 | A | * | 3/1965 | Muller | 280/124.153 |
| 3,575,253 | A |   | 4/1971 | Brumm |   |
| 5,000,476 | A | * | 3/1991 | Lindorfer et al. | 280/124.107 |
| 5,458,359 | A | * | 10/1995 | Brandt | 280/124.111 |
| 6,375,203 | B1 | * | 4/2002 | Warinner et al. | 280/81.6 |

* cited by examiner

*Primary Examiner*—Paul N. Dickson
*Assistant Examiner*—Joselynn Y. Sliteris
(74) *Attorney, Agent, or Firm*—Kloss, Stenger & LoTempio; Vincent G. LoTempio; Douglas R. Smith

(57) ABSTRACT

A suspension system for a motor vehicle that controls torque reaction comprising a chassis, a rigid drive axle, an opposite axle, a road wheel attached to each end of each axle, at least one torque reaction control link positioned longitudinally of the motor vehicle between the road wheels, at least two longitudinal control arms attached proximate the road wheels, for longitudinal control of the drive axle, so that the at least one torque reaction control link has a longitudinal plane that extends longitudinally of the motor vehicle and whereby the effective projection lines of the at least two longitudinal control arms and the longitudinal plane of the at least one torque reaction control link intersect each other in the direction of the opposite axle, forming a convergent angle and that when a force moves the rigid drive axle vertically up the convergent angle does not increase.

6 Claims, 6 Drawing Sheets

TORQUE REACTION CONTROL LINK

This application is a continuation-in-part of patent application Ser. No. 10/909,189, filed Jul. 30, 2004, now U.S. Pat. No. 7,334,806 and claims priority of U.S. Provisional Patent Application 60/491,503, filed on Jul. 31, 2003, titled: Torque Reaction Control Link.

BACKGROUND OF THE INVENTION

1. Field of Invention

This invention relates to a rigid drive axle suspension system for motor vehicles.

2. Description of Prior Art

Typically, as part of an automobiles suspension, the driveshaft between the engine/transmission and the rigid drive axle gear housing is enclosed in a "torque tube." The torque tube is rigidly attached to a drive axle/gear housing assembly at one end and the other end has a "ball" that is enclosed by "ball drive housing" that is attached to the output end of the transmission. Inside the "ball" is the universal joint that rotates the driveshaft inside the "torque tube." At the axle gear housing the driveshaft rotates the pinion gear through a straight splined coupling.

This design has severe limitations in that the complete axle housing has to pivot from the "ball" at the transmission in all planes. This makes it difficult to control the bump and roll steer of the axle as desired.

Presently, many race cars use a modified form that incorporates a sliding or "slipper ball" end of the torque tube that allows the torque tube's length to change. This allows some design freedom, but still has limitations, in that there is no allowance for lateral shifting of the axle perpendicular to the torque tube. To overcome these shortcomings many other cars now use a torque arm with an open driveshaft. The torque arm is rigidly attached to the axle housing and extends toward the transmission. The end of the torque arm attached to the chassis near the transmission may be mounted in rubber. Sometimes it is attached to the chassis through a pivotally connected short vertical link.

Other designs typically have the torque arm attached to the chassis through a shock absorber with a parallel spring. This allows the end of the torque arm to move in all planes with the vertical plane controlled by the spring and shock absorber.

A torque arm has limitations on the length of the side view swing arm (SVSA) because of the placement of the engine/transmission in the chassis of the vehicle. It may also intrude into the body of the vehicle.

All of these designs are limited, because the length of the torque tube or torque arm is restricted by the distance between the rigid drive axle and the transmission. Because of this limitation, the torque reaction is fed into the chassis at less than one half of the wheelbase of the vehicle. This causes the torque reaction to lift the chassis both at the front and at the rear. The lifting of the chassis at the end where the drive axle is located decreases the sprung weight and increases the undamped weight on the drive axle, thereby reducing the control of the axle by the shock absorbers, when the wheels and axle move vertically over irregular terrain.

There is also a considerable change of the pinion angle in the negative direction when the axle is displaced vertically with the short torque tube or torque arm. This change in the negative direction of pinion angle causes forward rotational scrub of the tire contact patch on the ground, and when accelerating, a loss of traction. Pinion angle, usually measured in degrees is the convergent angle formed by the planes of the horizon and the longitudinal axis of the pinion gear intersecting. Zero pinion angle is when the planes are parallel. Negative pinion angle is when the planes are convergent toward the center of the vehicle and positive pinion angle is when they are convergent away from the center.

Various vehicle suspension systems have been designed to allow a vehicle to maintain traction of the drive axle tires when accelerating over irregular terrain. U.S. Pat. No. 2,300,844 (Olley) discloses a four link suspension having upper links that are shorter than the lower links. In this invention the instant center produced by the projection lines of the upper and lower links intersecting will move closer to the drive axle when the axle goes into a bump condition. The problem with this design is the side view swing arm (SVSA) is relatively short and becomes shorter with the movement of the instant center toward the drive axle which causes an increase in the pinion angle change in the negative direction and the conversion of sprung weight on the drive axle to direct vertical force or undamped weight on the tires or road wheels thus decreasing the ability of the tires to maintain traction over irregular surfaces while accelerating.

Another vehicle suspension systems is disclosed in U.S. Pat. No. 3,575,253 (Brumm) in which a rigid driven rear axle is connected adjacent each end of the vehicle body by single longitudinal link and by a spring strut consisting of a helical spring and a telescopic shock absorber. The projected line of the link intersects with the projected line of the vehicles chassis and the resulting instant center lies at a point beyond the axle opposite the drive axle. This awkward configuration results in the instant center shifting from one end of the vehicle to the opposite end when the drive axle moves into a bump condition. The problem with this design is that the when the drive axle moves into a bump condition the torque reaction of the axle when accelerating will pull the vehicle's chassis down at the drive axle decreasing available chassis clearance to the ground, drive axle clearance to the chassis and the springs and shock absorbers available stroke. Another problem with this design is that it calls for the spring strut or shock absorber bearing the axle's reaction forces in a bending mode.

Thus it is readily apparent that there is a longfelt need for a vehicle suspension system that positions the instant center closer to the opposite axle that will remain at a relatively static position or move away from the rigid drive axle toward or beyond the opposite axle during a bump condition. A significant deficiency with the previous developed solutions, as well as many other similar devices, is that they provide a vehicle suspension system that limits the ability of the vehicle's drive axle tires to maintain traction when accelerating over irregular terrain and/or puts the drive axle reaction forces on the spring strut or shock absorber rather than the axle attachment structures. The present invention satisfies the above-mentioned needs, as well as others, and overcomes the deficiencies in devices heretofore developed.

SUMMARY OF THE INVENTION

The invention relates to a suspension system for a motor vehicle that controls the torque reaction of the rigid drive axle in combination with the longitudinal control of the rigid drive axle comprising a chassis, a rigid drive axle, an opposite axle and road wheels attached to the ends of each axle, a torque reaction control link positioned longitudinally of the motor vehicle between the road wheels and with one or two pairs of longitudinal control arms pivotally attached to the axle attachment structures that are rotatably mounted on the rigid drive axle proximate the road wheels, positioned longitudinally of the motor vehicle. The torque reaction control link is for controlling torque reaction of the rigid drive axle in combination with the longitudinal control arms. The torque reaction control link is attached between the road wheels at the rigid drive axle at a lower elevation than the rigid drive axle attachment point of the longitudinal control arms. Each pair of longitudinal control arms are pivotally connected to the rigid drive axle at one end and to the chassis at the other end, so that each of the longitudinal control arms has an effective projection line longitudinally of the motor vehicle. The torque reaction control link is pivotally connected to the rigid drive axle at one end and to the chassis at the other, so that the torque reaction control link has a longitudinal plane that extends longitudinally of the motor vehicle and whereby the effective projection lines of the pair or pairs of longitudinal control arms and the longitudinal plane of the torque reaction control link intersect each other toward the opposite axle and forming a convergent angle which results in a side view swing arm (SVSA) any length desired and that when a force moves the rigid drive axle vertically up the side view swing arm (SVSA) remains the same length or lengthens and the convergent angle does not increase.

It is an object of the present invention to provide a torque reaction control link in a lower position than a torque tube or an open drive shaft with a torque arm so that there is no intrusion into the vehicles body.

It is a further object to provide a torque reaction control link on a rigid drive axle suspension with a proper length and installation angle from horizontal and a side view swing arm (SVSA) that may be any length desired that will remain the same or lengthen when the axle moves up vertically into a bump condition.

Still a further object of the present invention is to provide a torque reaction control link suspension that minimizes pinion angle change in the negative direction when the axle moves up vertically into a bump condition.

Still another object of the present invention is to provide a torque reaction control link suspension to minimize the conversion of sprung weight on the drive axle to an undamped vertical force on the tires.

Still another object of the present invention is to provide a torque reaction control link suspension for a rigid drive axle suspension that allows a vehicle to maintain traction of the drive axle tires when accelerating over irregular terrain.

Still another object of the present invention is to provide a torque reaction control link suspension in which no bending moments will be induced into the shock absorbers or spring struts.

DESCRIPTION OF THE PREFERRED EMBODIMENT

Figure 1:
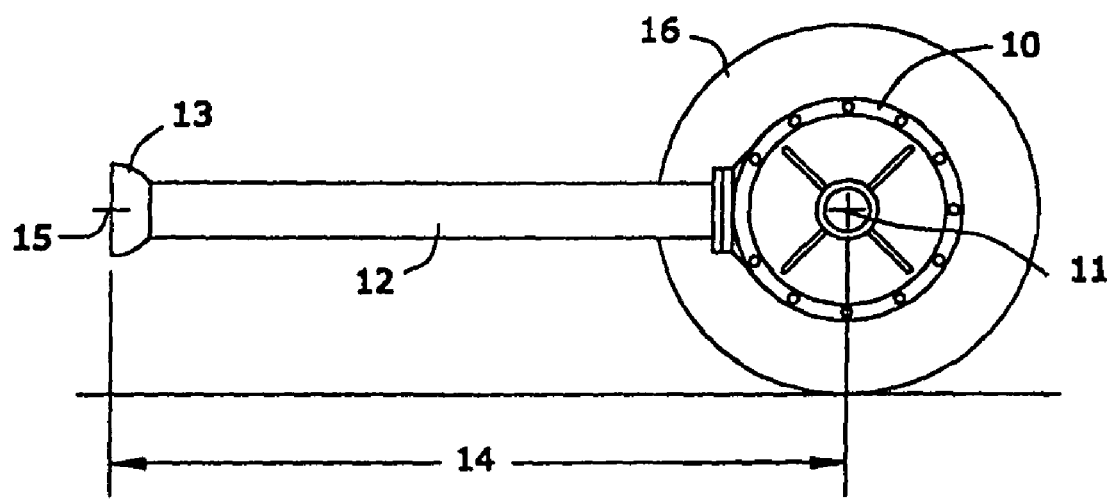
FIG. 1 is a side view of a prior art torque tube rigid drive axle suspension for a motor vehicle.

This application is a divisional from patent application Ser. No. 10/909,189 and claims priority of U.S. Provisional Patent Application 60/491,503, filed on Jul. 31, 2003, titled: Torque Reaction Control Link.

At the outset, it should be clearly understood that like reference numerals are intended to identify the same structural elements, portions, or surfaces consistently throughout the several drawing figures, as may be further described or explained by the entire written specification of which this detailed description is an integral part. These embodiments should not be construed as the only applications that the inventions may be used.

A significant deficiency with the previously developed suspension systems such as those depicted in FIGS. 1-4, as well as many other similar devices, is that they provide a vehicle suspension system that limits the ability of the vehicle drive axle tires to maintain traction when accelerating over irregular terrain and/or puts the drive axle reaction forces on the spring strut or shock absorbers rather than the axle attachment structures. These axles are fitted with rotatable axle attachment structures called birdcages. When birdcages are used the axle becomes known as decoupled. A decoupled rigid drive axle is one in which the longitudinal control and the torque reaction control are independent of each other. A birdcage is a device with a bearing that has an inside diameter that fits over the outside diameter of an open or closed axle tube. The bearing is retained in a housing and the housing has upper and lower brackets rigidly attached to it. The brackets are nominally positioned above and below the axle's vertical center. Each bracket has an attachment point for pivotally connecting a longitudinal control arm. An open tube axle is a rigid drive axle that serves two purposes: the open tube axle is a rigid beam that connects the wheels together and it rotates the wheels simultaneously. Birdcages are needed to allow the open tube axle to rotate. Sometimes, closed tube rigid drive axles are fitted with birdcages because the design of the suspension system requires a decoupled axle but for various reasons an open tube axle is not wanted. A closed tube rigid drive axle has the rotating axles enclosed in housings called tubes. The tubes extend outward from both sides of the drive axle's gear housing to hubs and wheels. Any rigid drive axle that uses bird cages must have a device such as a torque tube or a torque arm that is rigidly attached to the drive axle's gear housing and pivotally attached to the vehicle's chassis to keep the gear housing from rotating about the axle. The torque reaction control link of the present invention replaces the heavier and more costly torque tube or torque arm and when used with the birdcages the rigid drive axle becomes partially decoupled.

The invention relates a torque reaction control link for a partially decoupled open or a closed tube rigid drive axle suspension for a motor vehicle using two pairs of longitudinal control arms (lower longitudinal control arm 24 and upper longitudinal control arm 22 constitutes a pair). Each longitudinal control arm has two pivotal attachment points, one at the axle and one at the chassis. Each longitudinal control arm may be arranged to extend longitudinally in the same direction or in opposite direction from the rigid drive axle to the chassis. The longitudinal control arms may be of equal or unequal length, parallel or not parallel to each other. The upper and lower longitudinal control arms will have an effective projected longitudinal line (projection line 23). The preferred embodiment of the present invention uses a straight line mechanism commonly called a Watt's Link, proximate each road wheel, for the sole longitudinal control of the rigid drive axle. This mechanism is designed using three components. In this application a generally or near vertical center component provides a means to pivotally connect two generally or near horizontal components to the rigid drive axle. The generally or near vertical component is an axle attachment structure called a birdcage which is rotatably mounted and laterally secured as a means for attachment to the rigid drive axle. The two approximately horizontal components are called upper and lower longitudinal control arms. The upper longitudinal control arm is pivotally connected to the upper bracket of the birdcage and the lower longitudinal control arm is pivotally connected to the lower bracket of the birdcage. The opposite ends of each of the longitudinal control arms are pivotally connected to the chassis of the motor vehicle, in opposite directions longitudinally and approximately perpendicular from the rigid drive axle. With proper design and arrangement of the components the rigid drive axle can be made to move in an approximate straight vertical line over a short span. Perpendicular to the approximate straight vertical movement of the rigid drive axle is the effective longitudinal control arm of the axle. Because the vertical movement is nearly straight the longitudinal control point is close to infinity; thus an effective projected longitudinal control arm is near infinite in length. The torque reaction control link of the present invention is limited in length and is positioned longitudinally in the motor vehicle, lower than the longitudinal control arms at the rigid drive axle attachment point and the installed horizontal slope of the torque reaction control link must be such that the longitudinal plane through the pivotal connection points at the rigid drive axle and the motor vehicle's chassis of the torque reaction control link must converge and intersect with the effective projected longitudinal control arm of the Watt's Link, toward the opposite axle. The point where they intersect is called an instant center and the horizontal distance from the rigid drive axle to the instant center is called a side view swing arm. When the rigid drive axle moves vertically up, the horizontal slope of the torque reaction control link will change more than the slope of the effective projection of the longitudinal control arm of the Watt's Link, because the torque reaction control links' length is shorter than the effective length of the longitudinal control arm. The convergent angle formed by the intersection of the longitudinal plane of the torque reaction control link and the effective projected longitudinal control arm of the Watt's Link will become more acute and the instant center will move further from the rigid drive axle toward the opposite axle or beyond. The side view swing arm will lengthen.

Figure 7:
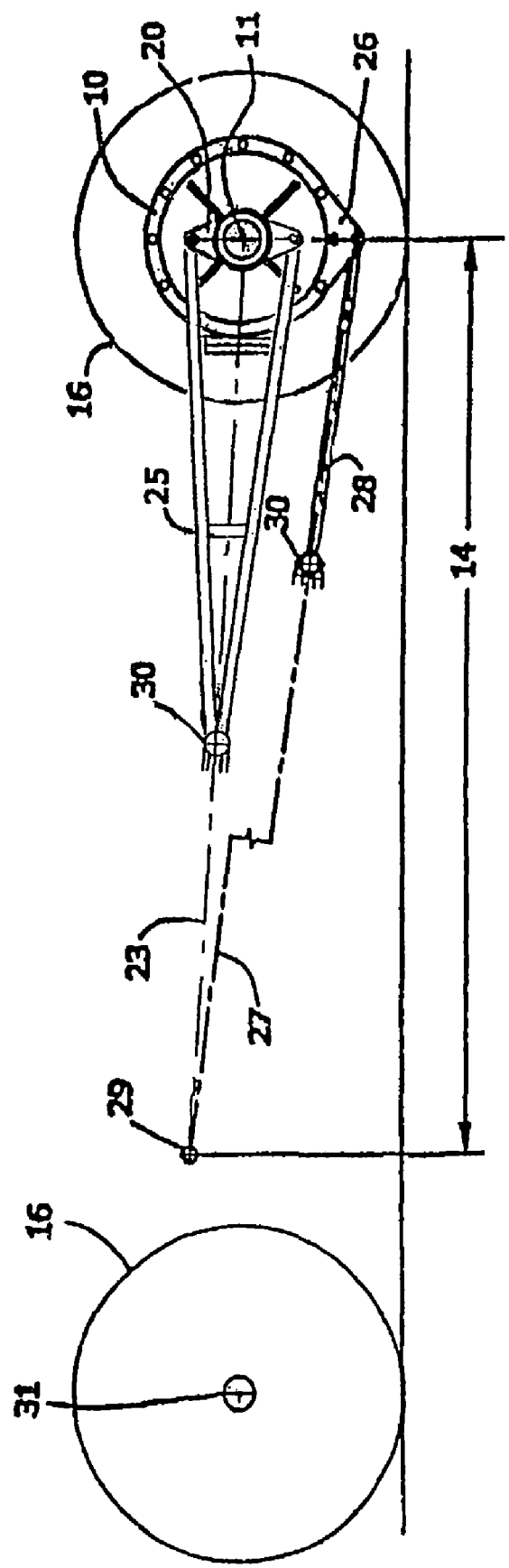
FIG. 7 is a side view of a partially decoupled open or closed tube rigid drive axle inverted three link suspension system for a motor vehicle depicting another preferred embodiment of a torque reaction control link of the present invention.

Another preferred embodiment of the invention (as shown in FIG. 7) relates to a torque reaction control link for a partially decoupled open or a closed tube rigid drive axle suspension using a pair of triangular longitudinal control arms 25 each generally configured to be attached to the vehicle at three connection points: two near vertical pivotal attachment points at the rigid drive axle and a pivotal attachment point at the chassis.

Adverting now to the drawings, FIG. 1 is a side view of a prior art torque tube rigid drive axle suspension for a motor vehicle. Torque tube 12 is rigidly attached to rigid drive axle/gear housing assembly 10 at one end, the other end is attached to ball 13 that is enclosed in a housing (not shown) affixed to the transmission output end. The side view swing arm (SVSA) 14 for a torque tube suspension is the horizontal distance from the center of rigid drive axle/gear housing assembly 10 to pivot point 15 of the torque tube 12 at the output end of the vehicle transmission. A problem with this basic design is that the torque tube has limitations on the length of the side view swing arm (SVSA) because of the placement of the engine/transmission in the chassis of the vehicle. Furthermore when the axle moves vertically into bump the pinion angle changes in a negative direction which results in forward rotational scrub of the road wheels. There has been a longfelt need to lengthen the side view swing arm without moving the engine/transmission further from the rigid drive axle.

Figure 2:
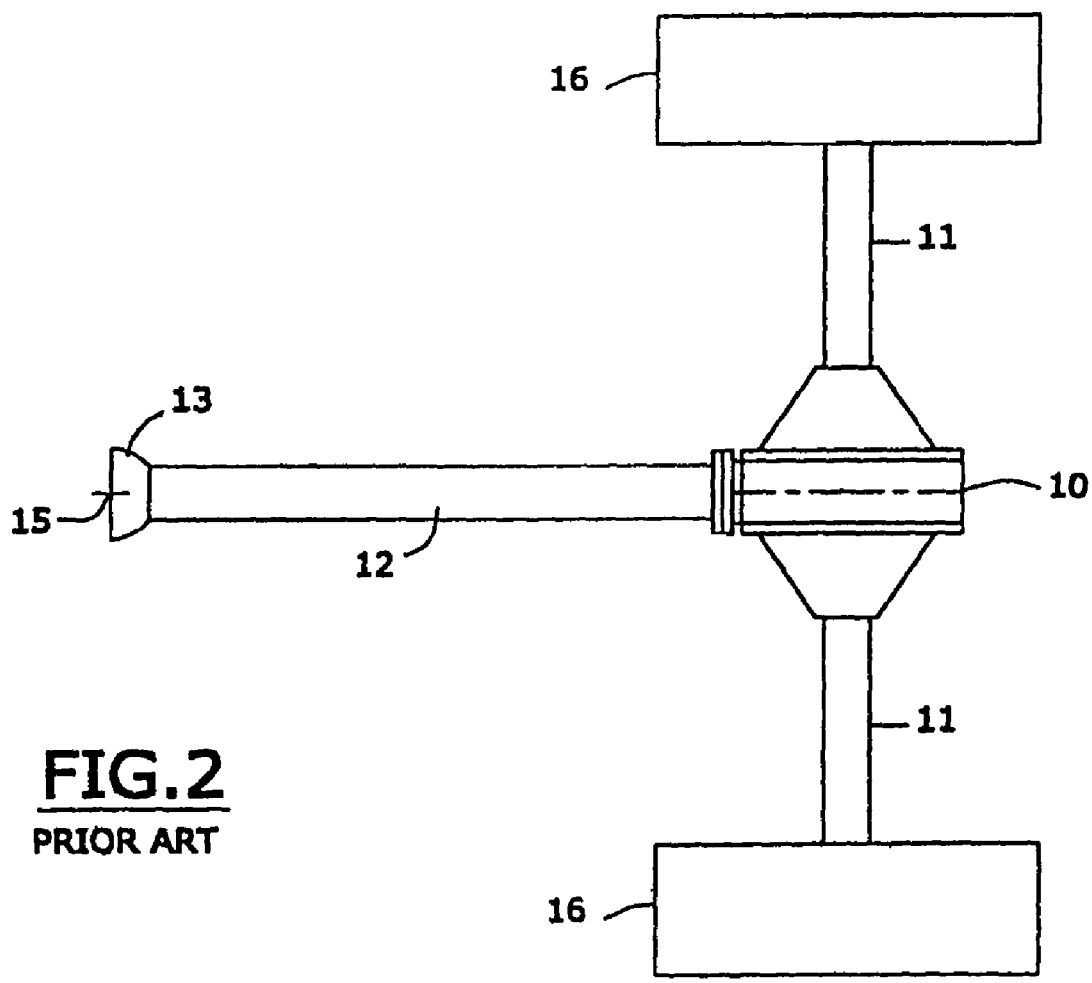
FIG. 2 is a top view of a prior art torque tube rigid drive axle suspension for a motor vehicle.

FIG. 2 is a top view of prior art torque tube rigid drive axle suspension for a motor vehicle. Torque tube 12 is rigidly attached to rigid axle/gear housing assembly 10 which is mounted to rigid drive axle 11. Mounted at opposite ends of rigid drive axle 11 are road wheels 16. Rigid drive axle 11 in this type of suspension system is either an open tube or a closed tube drive axle. An open tube is a rigid drive axle that serves two purposes: it is a rigid beam that connects the left and right road wheels together and it rotates the road wheels simultaneously. A closed tube axle is a rigid drive axle that has the rotating axles enclosed in housings called tubes that extend from both sides of the gear housing outward to the road wheels. FIGS. 1 and 2 do not show transmission, chassis, axle attachment structures, longitudinal control arms, track bar, springs or shock absorbers for clarity.

Figure 3:
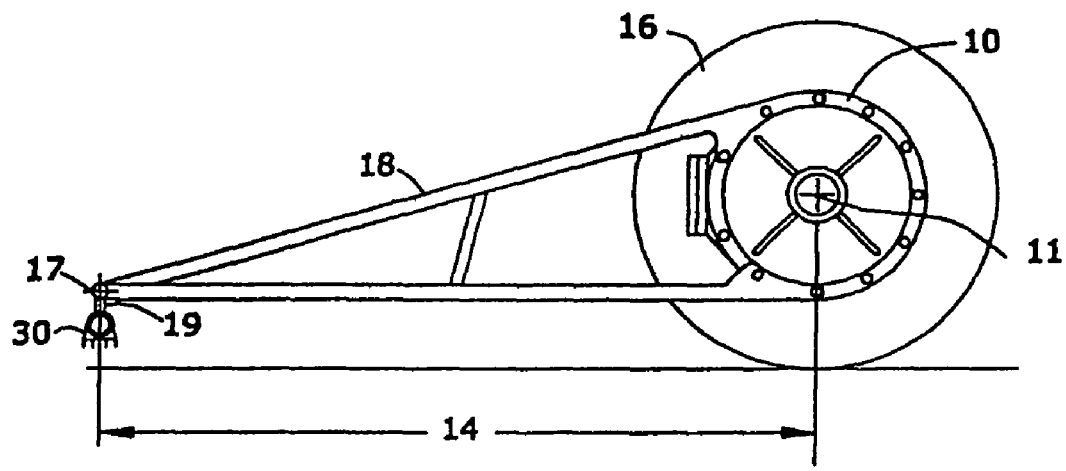
FIG. 3 is a side view of a prior art torque arm rigid drive axle suspension for a motor vehicle.

FIG. 3 is a side view of prior art torque arm rigid drive axle suspension for a motor vehicle. Torque arm 18 is oriented in a longitudinal direction toward the transmission. One end of torque arm 18 is rigidly attached to a rigid drive axle/gear housing assembly 10 and the other end is attached to the chassis near the transmission and may be mounted in rubber or pivotally connected to chassis 30 through vertical link 19. SVSA 14 for a torque arm used in conjunction with a rigid drive axle suspension is the horizontal distance from the center of rigid drive axle/gear housing assembly 10 to pivot point 17 proximate the vehicles chassis. The same problem that exists with a suspension system that includes a torque tube is present with this basic design. The SVSA for the torque arm is dependent on the length of the torque arm which in turn is limited by the placement of the engine/transmission in the chassis of the vehicle. Clearly there has been a longfelt need have a longer SVSA without having to move the engine/transmission further from the drive axle. The vehicle suspension system of the present invention positions the instant center closer to the opposite axle, and it will remain at a relatively static position or move away from the drive axle toward or beyond the opposite axle during a bump condition and thus does not have the limitation in length of the side view swing arm.

Figure 4:
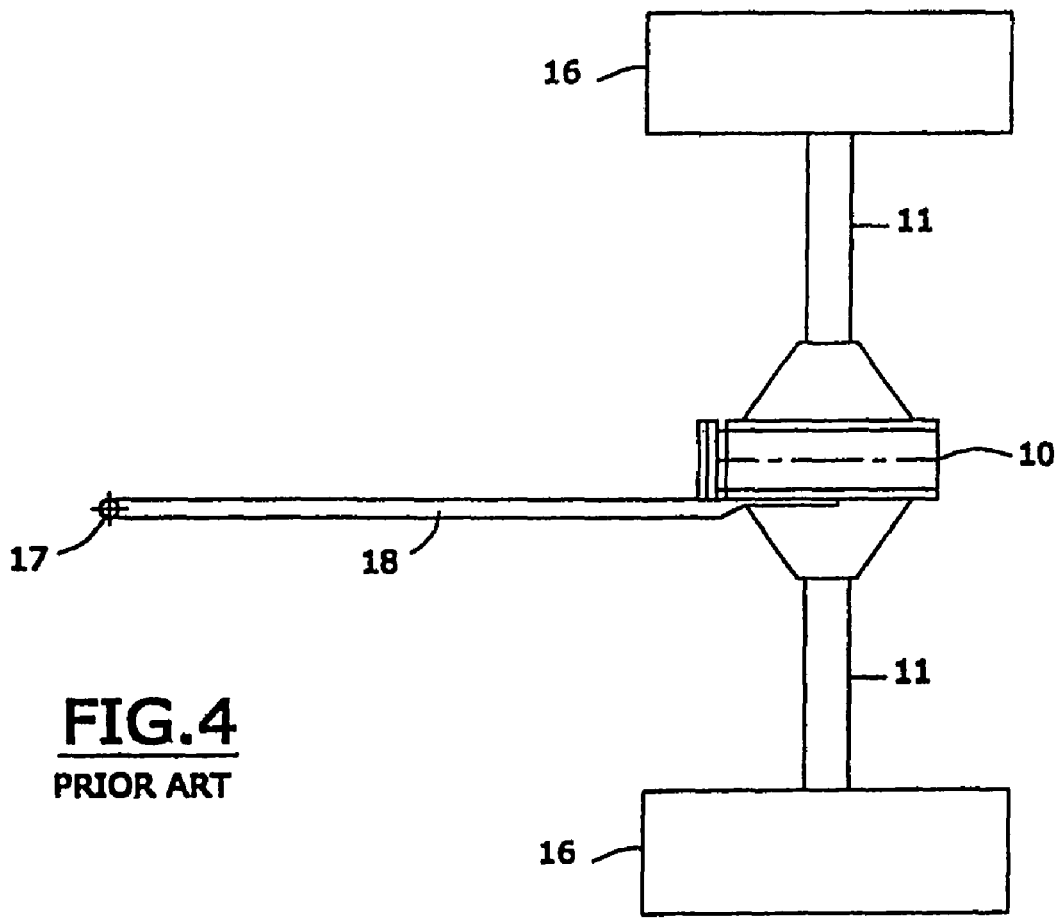
FIG. 4 is a top view of a prior art torque arm rigid drive axle suspension for a motor vehicle.

FIG. 4 is a top view of a prior art torque arm rigid drive axle suspension for a motor vehicle. Mounted at opposite ends of rigid drive axle 11 are road wheels 16. Torque arm 18 is rigidly attached to rigid drive axle/gear housing assembly 10. FIGS. 3 and 4 do not show transmission, drive shaft, axle attachment structures, longitudinal control arms, track bar, springs or shock absorbers. The drawings of the drive axles shown in FIGS. 1-4 do not show any longitudinal control for clarity.

Unlike the decoupled rigid drive axle depicted in FIGS. 1-4 the preferred embodiments of the instant invention depicted in FIGS. 5-8 show a torque reaction control link for a partially decoupled open or a closed tube rigid drive axle suspension. A partially decoupled rigid drive axle uses the torque reaction control link of the present invention and the longitudinal control arms in combination, to control the axle's torque reaction, but the longitudinal control of the axle is independent or decoupled from the torque reaction control.

Figure 5:
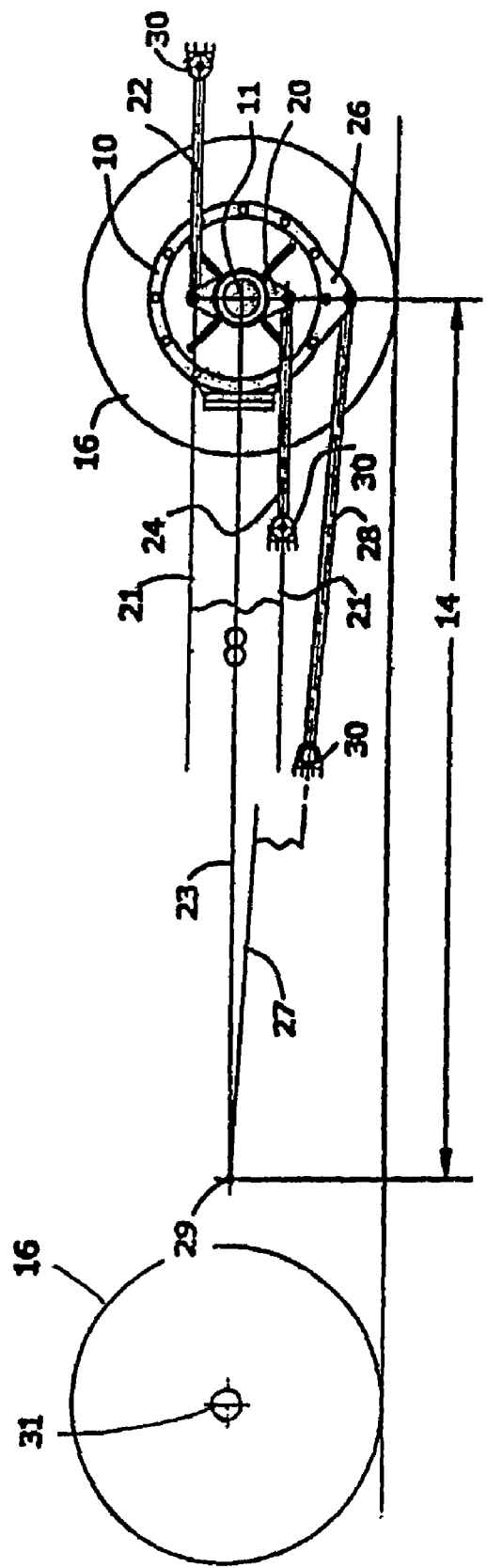
FIG. 5 is a side view of a partially decoupled open or closed tube rigid drive axle suspension for a motor vehicle depicting a preferred embodiment of a torque reaction control link of the present invention.

FIG. 5 is a side view of a partially decoupled open or closed tube rigid drive axle suspension for a motor vehicle depicting torque reaction control link 28 of the present invention. At the outboard ends of rigid drive axle 11, near the road wheels 16, axle attachment structures 20 are rotatably mounted and laterally secured on to rigid drive axle 11. Upper longitudinal control arms 22 are pivotally connected to the upper brackets on axle attachment structures 20 and their opposing ends are pivotally connected to chassis 30 in the direction away from the opposite axle 31. Upper longitudinal control arms are positioned above the rigid drive axle and extend longitudinally of the vehicle. Lower longitudinal control arms 24 are positioned longitudinally of the vehicle and are pivotally connected to lower brackets on rotatable axle attachment structures 20 and their opposite ends are pivotally connected to chassis 30 in the direction of the opposite axle 31. Lower longitudinal control arms 24 are pivotally connected to axle attachment structures 20 at an elevation below the rigid drive axle. The two pairs of longitudinal arms control the fore and aft location of the axle in relationship to the vehicle, independent of the torque reaction control and therefore the longitudinal control is decoupled. Lower axle attachment structure 26 is rigidly attached to the underside of the rigid drive axle/gear housing 10 to which one end of torque reaction control link 28 is pivotally connected. The other end of torque reaction control link 28 is pivotally connected to chassis 30 toward the opposite axle 31. Torque reaction control link 28 is attached at an attachment point on rigid drive axle at a lower elevation than the attachment points of longitudinal control arms 22 and 24 at the rigid drive axle. The torque reaction control of the axle is achieved with the longitudinal control arms working in combination with the torque reaction control link, therefore the torque reaction control is not decoupled. There is an effective projection line 23 for longitudinal control for rigid drive axle 11, used in conjunction with birdcages as the axle attachment structures. If upper and lower longitudinal control arms 22 and 24 are not parallel to each other longitudinally, the effective projection line 23 for longitudinal control passes through the convergent point of upper and lower longitudinal control arms 22 and 24 individual projected lines 21, and the longitudinal/vertical center of the rigid drive axle. If upper and lower longitudinal control arms 22 and 24 are parallel to each other longitudinally as shown in FIG. 5; effective projection line 23 for longitudinal control is parallel to upper and lower longitudinal control arms 22 and 24, and passes through the longitudinal/vertical center of rigid drive axle 11.

Effective projection line 23 for longitudinal control converges at an angle with longitudinal plane 27 for the torque reaction control link and the point at which effective projection line 23 and longitudinal plane 27 intersect is instant center 29. Instant center 29 is the point from where the complete rigid drive axle/gear housing assembly 10 rotates about when rigid drive axle 11 moves vertically. The horizontal distance from the center of the rigid drive axle/gear-housing assembly to instant center 29 is SVSA 14 for this embodiment of the present invention. The change of the horizontal slope of effective projection line 23 for longitudinal control will be less than the change of the slope for torque reaction control link 28 when the rigid drive axle 11 moves up vertically. The result of the upward movement of rigid drive axle 11 is that instant center 29 will move away from rigid drive axle 11 and SVSA 14 will lengthen. In both embodiments of the present invention torque reaction control link 28 may be a single link, a pair of parallel links, a pair of links convergent toward the chassis from the axle, a pair of links convergent toward the axle from the chassis, a triangular A-Arm with the apex at the chassis and the pair of opposite ends at the axle or the apex at the axle and the pair of opposite ends at the chassis. Torque reaction control link 28 may have a hydraulic tracking damper with a compression spring, a spring rod with compression springs, or a torque absorber using resilient strut bushings or springs, all operatively arranged as part of its length.

Figure 6:
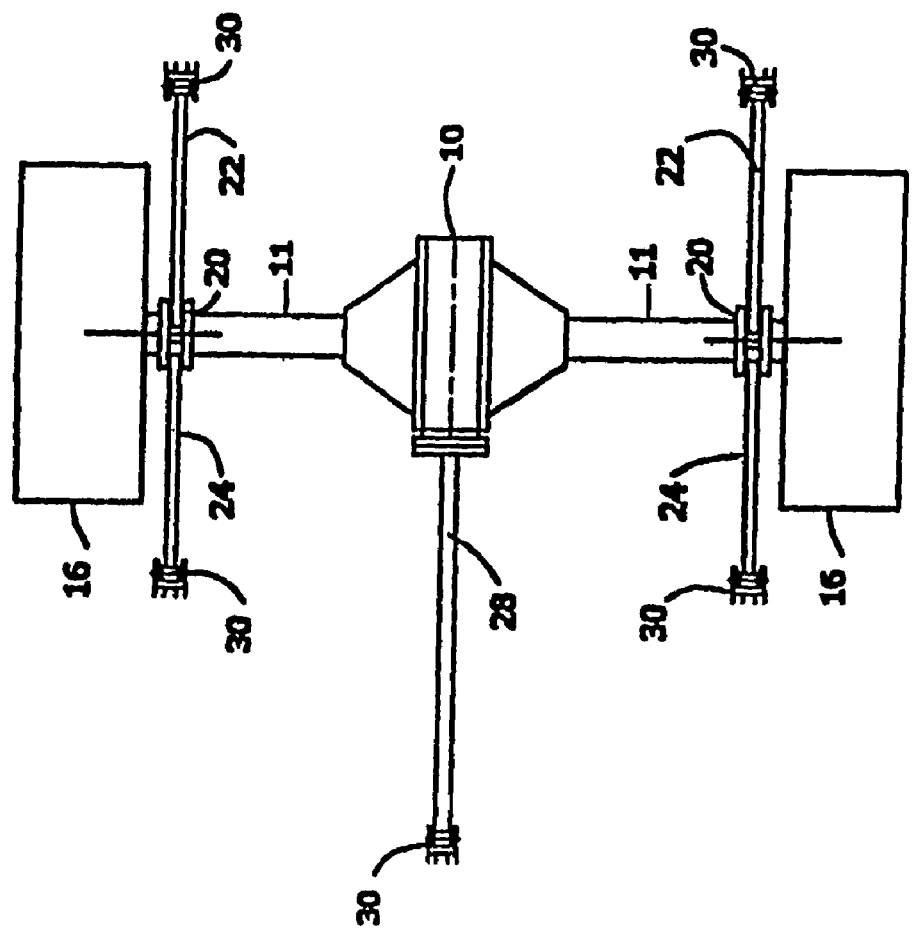
FIG. 6 is a top view of a partially decoupled open or closed tube rigid drive axle suspension for a motor vehicle depicting a preferred embodiment of a torque reaction control link of the present invention.
Figure 6:
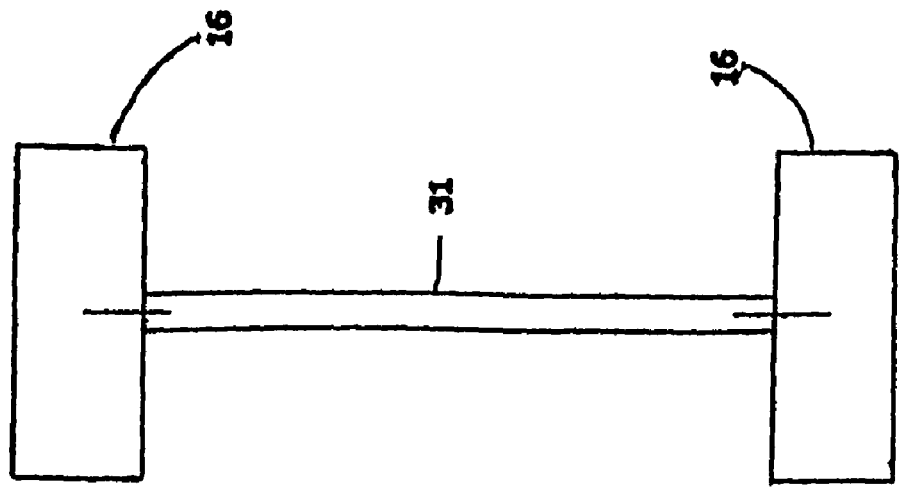

FIG. 6 is a top view of a partially decoupled open or closed tube rigid drive axle suspension for a motor vehicle depicting torque reaction control link 28 of the present invention, longitudinally positioned in between road wheels 16 with one end pivotally connected to the chassis 30 toward the opposite axle 31. The opposite end is pivotally connected to lower axle attachment structure 26 (not visible on drawing) because it is rigidly attached below to the rigid drive axle/gear housing assembly 10. Axle attachment structures 20 are rotatably mounted and laterally secured on to the outboard ends of rigid drive axle 11, near road wheels 16. One end of the upper longitudinal control arms 22 are each pivotally connected to the upper brackets on axle attachment structures 20, and their opposite ends are pivotally connected to chassis 30 away from the opposite axle 31. One end of the lower longitudinal control arms 24 are each pivotally connected to the lower brackets on the axle attachment structures 20 and their opposite ends are pivotally connected to chassis 30 disposed longitudinally in the direction of the opposite axle 31.

FIG. 7 is a side view of a partially decoupled open or closed tube rigid drive axle inverted three link suspension for a motor vehicle depicting torque reaction control link 28 as the third link of the present invention. Another preferred embodiment of the invention relates to a torque reaction control link for a partially decoupled open or a closed tube rigid drive axle suspension using a pair of triangular longitudinal control arms 25 each generally configured to be attached to the vehicle at three connection points: two near vertical pivotal attachment points at the rigid drive axle and a pivotal attachment point at the chassis. Near road wheels 16, axle attachment structures 20 are mounted and laterally secured on to rigid drive axle 11. Triangular longitudinal control arms 25 each have one end pivotally connected to an axle attachment structure 20, and their opposite ends are pivotally connected to chassis 30 toward the opposite axle 31. Lower axle attachment structure 26 is rigidly attached to the underside of rigid drive axle 11, between road wheels 16. One end of torque reaction control link 28 is pivotally connected to the lower axle attachment structure 26 and its opposite end is pivotally connected to chassis 30, toward the opposite axle 31. Torque reaction control link 28 has to be positioned lower than the longitudinal control arms at the rigid drive axle. Effective projection line 23 for longitudinal control converges at an angle with effective longitudinal plane 27 for the torque reaction control link, and where the lines intersect is instant center 29. Instant center 29 is the point from where the complete rigid drive axle/gear housing assembly 10 rotates about when rigid drive axle 11 moves vertically. The horizontal distance from the center of the rigid drive axle/gear-housing assembly to instant center 29 is SVSA 14 for this embodiment of the present invention. The change of the horizontal slope of effective projection line 23 for longitudinal control will be less than the change of the slope for torque reaction control link 28 when the rigid drive axle 11 moves up vertically. The result of the upward movement of rigid drive axle 11 is that instant center 29 will move away from rigid drive axle 11 and SVSA 14 will lengthen.

Figure 8:
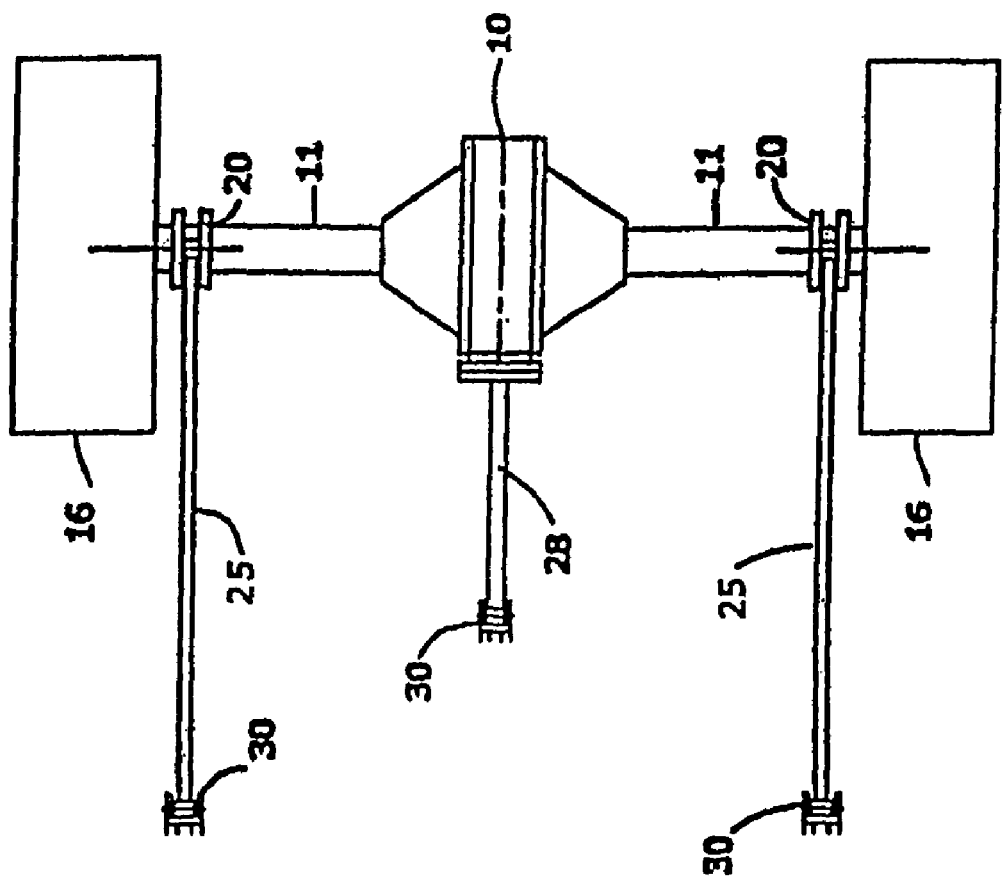
FIG. 8 is a top view of a partially decoupled open or closed tube rigid drive axle inverted three link suspension systems for a motor vehicle depicting another preferred embodiment of a torque reaction control link of the present invention.
Figure 8:
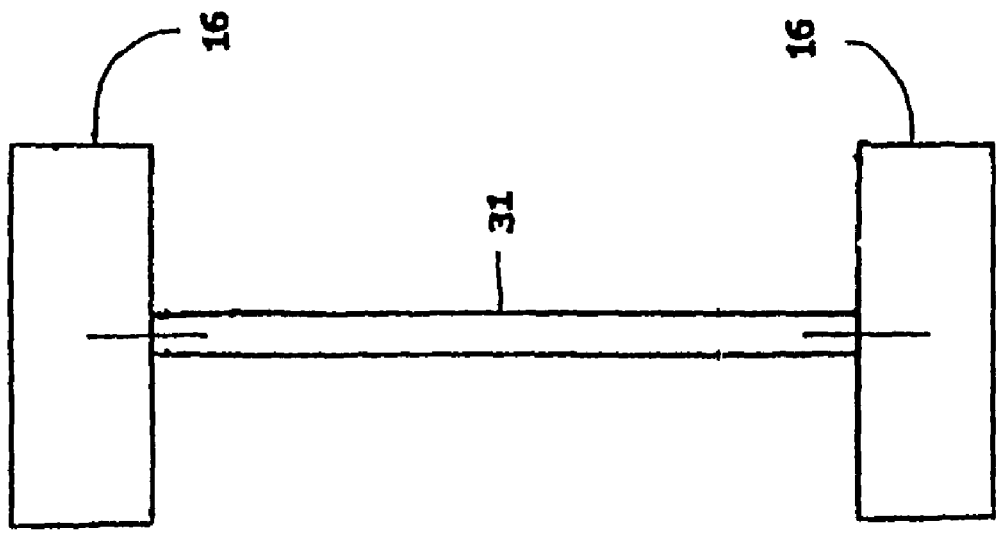

FIG. 8 is a top view of a partially decoupled open or closed tube rigid drive axle inverted three link suspension for motor vehicle depicting torque reaction control link 28 as the third link of the present invention. Torque reaction control link 28 is longitudinally positioned between the road wheels 16 and one end is pivotally connected to chassis 30 toward opposite axle 31. The opposite end of torque reaction control link 28 is pivotally connected to lower axle attachment structure 26, because it is rigidly attached below to rigid drive axle/gear housing assembly 10. Near road wheels 16, axle attachment structures 20 are mounted and laterally secured on to rigid drive axle 11. Triangular longitudinal control arms 25 each have one end pivotally connected to the upper and lower axle rotatable attachment structure 20 with their opposite ends pivotally connected to chassis 30, toward the opposite axle 31. No track bar, springs or shock absorbers are shown in FIGS. 5-8 for clarity.

A vehicle configured with a suspension system of the instant invention will be able to maintain traction of the drive axle tires, when accelerating over irregular terrain because there is less pinion angle change in the negative direction. The change is caused by the radius of the SVSA moving in an arc when the axle is vertically displaced. This change can be almost instantaneous when the axle and tires go into a bump condition. If the vehicle is accelerating at or near the limit of adhesion and the axle and tires are suddenly rotated in a forward direction by the pinion angle change, the tires are forced to scrub on the road surface a distance proportional to the angular change at the radius of the tires. This causes the tires to lose adhesion or traction.

The drive axle tires of a vehicle equipped with torque reaction control link 28 of the present invention will maintain traction when accelerating over irregular terrain because there is less sprung weight removed from the drive axle and converted to an undamped vertical force on the tires. This conversion is caused by the torque reaction acting on the chassis in an upward vertical direction, through the suspension links at the instant center of SVSA 14. With a SVSA as long as the wheelbase there is no sprung weight removed from the drive axle, and more favorable sprung to unsprung weight ratio is maintained. This enables the shock absorbers to control the sprung and unsprung masses. The tires will then continue to provide traction.

While the invention has been described with reference to certain preferred embodiments, it will be appreciated by those skilled in the art that modifications and variations may be made without departing from the spirit and scope of the invention.

REFERENCE NUMERALS IN DRAWINGS

10. Axle/Gear Housing Assembly
11. Rigid Drive Axle
12. Torque Tube
13. Ball
14. SVSA
15. Pivot Point
16. Road Wheels
17. Pivot Point
18. Torque Arm
19. Vertical Link
20. Rotatable Axle Attachment Structure
21. Projected Lines
22. Upper Longitudinal Control Arm
23. Projection Line
24. Lower Longitudinal Control Arm
25. Triangular Longitudinal Control Arm
26. Fixed Lower Axle Attachment Structure
27. Longitudinal Plane
28. Torque Reaction Control link
29. Instant Center
30. Chassis
31. Opposite Axle

What is claimed is:

1. A suspension system for a motor vehicle that controls torque reaction comprising:
   a chassis;
   a rigid drive axle;
   an opposite axle;
   two rotatable axle attachment structures;
   at least one fixed lower axle attachment structure;
   a road wheel attached to each end of each axle;
   at least two longitudinal control arms attached to said two rotatable axle attachment structures at said rigid drive axle proximate said road wheels, for longitudinal control of said rigid drive axle;
   at least one torque reaction control link positioned longitudinally of said motor vehicle between said road wheels attached to said at least one fixed lower axle attachment structure for controlling torque reaction of said rigid drive axle in combination with said at least two longitudinal control arms;
   wherein one end of each said at least two longitudinal control arms are pivotally connected to said rotatable axle attachment structures proximate said road wheels and the other end of each said at least two longitudinal control arms are pivotally connected to said chassis, so that each said at least two longitudinal control arms has an effective projection line longitudinal of said motor vehicle;
   wherein one end of said at least one torque reaction link is pivotally connected to said at least one fixed lower axle attachment structure for said rigid drive axle and other end to said chassis, so that said at least one torque reaction control link has a longitudinal plane that extends longitudinally of said motor vehicle and whereby said effective projection lines of said at least two longitudinal control arms and said longitudinal plane of said at least one torque reaction control link intersect each other in the direction of said opposite axle, forming a convergent angle and that when a force moves said rigid drive axle vertically up said convergent angle does not increase.

2. The suspension system according to claim 1 wherein one end of each of said at least two longitudinal control arms are pivotally attached to said two rotatable axle attachment structures mounted on said rigid drive axle, proximate each of said road wheels, each of said rotatable axle attachment structure having two near vertical pivotal attachment points for said at least two longitudinal control arms.

3. A suspension system according to claim 1 wherein said at least two longitudinal control arms are two upper longitudinal control arms and two lower longitudinal control arms for longitudinal control of said rigid drive axle and each said upper and lower longitudinal control arm has a length disposed longitudinally of said vehicle and each said length of said upper longitudinal control arm is equal to each said length of said lower longitudinal control arm.

4. The suspension system according to claim 3 wherein said length of said upper longitudinal control arms are disposed in parallel to said length of said lower longitudinal control arms.

5. The suspension system according to claim 3 wherein said length of said upper longitudinal control arms are disposed in an opposite direction from said rigid drive axle than said lower longitudinal control arms.

6. A suspension system according to claim 1 wherein said at least two longitudinal control arms are two triangular longitudinal control arms each attached at one end at an attachment point on said rigid drive axle proximate said road wheels at a higher elevation than an attachment point of said at least one torque reaction control link on said rigid drive axle, and the other end of each of said triangular longitudinal control arm to said chassis disposed in the direction of said opposite axle, so that each said triangular longitudinal control arm has and effective projection line longitudinal of said motor vehicle.

* * * * *